(12) United States Patent
Smits et al.

(10) Patent No.: US 6,647,455 B2
(45) Date of Patent: Nov. 11, 2003

(54) ON-DIE CACHE MEMORY WITH REPEATERS

(75) Inventors: Kenneth R. Smits, San Ramon, CA (US); Bharat Bhushan, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 237 days.

(21) Appl. No.: 09/893,779

(22) Filed: Jun. 27, 2001

(65) Prior Publication Data

US 2003/0005222 A1 Jan. 2, 2003

(51) Int. Cl.[7] .............................................. G06F 12/08
(52) U.S. Cl. ...................... 711/5; 711/118; 365/230.03
(58) Field of Search ........................... 711/118, 5, 100, 711/101, 102, 103, 104, 105, 106, 107, 108; 370/492, 501; 365/230.03, 49

(56) References Cited

U.S. PATENT DOCUMENTS

| 4,725,945 | A | 2/1988 | Kronstadt et al. | |
|---|---|---|---|---|
| 5,752,260 | A | 5/1998 | Liu | 711/129 |
| 5,818,785 | A | 10/1998 | Ohshima | 365/230.03 |
| 5,883,814 | A | 3/1999 | Luk et al. | 711/141 |
| 5,893,151 | A | 4/1999 | Merchant | |
| 6,115,795 | A | 9/2000 | Gilda et al. | |
| 6,185,146 | B1 * | 2/2001 | Shioyama et al. | 365/230.03 |
| 2002/0138700 | A1 | 9/2002 | Holmberg | |

OTHER PUBLICATIONS

Richard C. Murphy and Peter M. Kogge, "Trading Bandwidth for Latency: Managing Continuations through a Carpet Bag Cache", Copyright 2002, IEEE Computer Society, Abstract.

* cited by examiner

Primary Examiner—Reginald G. Bragdon
Assistant Examiner—Midys Inoa
(74) Attorney, Agent, or Firm—Blakely, Sokoloff, Taylor & Zafman LLP

(57) ABSTRACT

A cache memory organized into banks of subarrays includes repeaters for connecting to the data provided by the subarrays to a global data bus. The repeaters comprise a logic gate providing either a NAND or NOR function coupled in series with an inverter. The logic gate has a first input connected to receive a first logic value of a bus line, and a second input coupled to receive data output from a subarray. The inverter drives the first logic value onto the bus line when the cache bank subarray is inactive, and drives the data value from the subarray onto the bus line when the cache bank subarray is activate.

30 Claims, 2 Drawing Sheets

ON-DIE CACHE MEMORY WITH REPEATERS

RELATED APPLICATIONS

This application is related to Ser. No. 09/894638 filed Jun. 27, 2001, entitled "CACHE ARCHITECTURE WITH REDUNDANT SUB ARRAY" and Ser. No. 09/894513 filed Jun. 27, 2001, entitled "CACHE ARCHITECTURE FOR PIPELINED OPERATION WITH ON-DIE PROCESSOR, both of which are assigned to the assignee of the present application.

FIELD OF THE INVENTION

The present invention relates generally to the field of very large scale integrated circuits fabricated on a single semiconductor die or chip. More particularly, the invention relates to the field of high-performance cache memories.

BACKGROUND OF THE INVENTION

Cache memories have been used to maximize processor performance, while maintaining reasonable system costs, for many years. A cache memory is a very fast buffer comprising an array of local storage cells that is used by a processor to hold frequently requested copies of data. A typical cache memory system comprises a hierarchy of memory structures, which usually includes a local (L1), on-chip cache that represents the first level in the hierarchy. A secondary (L2) cache is often associated with the processor for providing an intermediate level of cache memory between the processor and main memory. Main memory, also commonly referred to as system or bulk memory, lies at the bottom (i.e., slowest, largest) level of the memory hierarchy.

In a conventional computer system, a processor is coupled to a system bus that provides access to main memory. An additional backside bus may be utilized to couple the processor to a L2 cache memory. Other system architectures may couple the L2 cache memory to the system bus via its own dedicated bus. Most often, L2 cache memory comprises a static random access memory (SRAM) that includes a data array, a cache directory, and cache management logic. The cache directory usually includes a tag array, tag status bits, and least recently used (LRU) bits. (Each directory entry is called a "tag".) The tag RAM contains the main memory addresses of code and data stored in the data cache RAM plus additional status bits used by the cache management logic. By way of background, U.S. Pat. No. 6,115,795 discloses a computer system comprising a processor that includes second level cache controller logic for use in conjunction with an external second level cache memory.

Recent advances in semiconductor processing technology have made possible the fabrication of large L2 cache memories on the same die as the processor core. As device and circuit features continue to shrink as the technology improves, researchers have begun proposing designs that integrate a very large (e.g., multiple megabytes) third level (L3) cache memory on the same die as the processor core for improved data processing performance. While such a high level of integration is desirable from the standpoint of achieving high-speed performance, there are still difficulties that must be overcome.

Large on-die cache memories are typically subdivided into multiple cache memory banks, which are then coupled to a wide (e.g., 32 bytes, 256 bits wide) data bus. For example, U.S. Pat. Nos. 5,752,260 and 5,818,785 teach interleaved cache memory devices having a plurality of banks consisting of memory cell subarrays. In a very large cache memory comprising multiple banks, one problem that arises is the large RC signal delay associated with the long bus lines when driven at a high clock rate. Thus, there is a need for some sort of repeater device to connect each bank of cache memory to the data bus without loss of signal integrity.

One traditional method for sharing a bus is to have each circuit utilize a tri-state driver in order to connect to the bus. Tri-state driver devices are well known in the prior art. A conventional tri-state driver comprises two transistor devices coupled in series to pull the output to either a high or low logic level. The third output state is a high impedance (i.e., inactive) state.

When a tri-state driver is utilized to connect to a bus, the two series-connected output devices of the driver need to be large so as to provide adequate drive strength to the long bus wire. This requirement, however, makes it difficult to use tri-state drivers as repeaters in a multi-megabyte on-die cache memory because the large source/drain diode of the output devices adds considerable load to the bus. The additional load attributable to the tri-state drivers increases bus power and causes significant RC signal delay. Another drawback of using tri-state drivers as repeaters is the need for decoding circuitry for the drivers. This decoding circuitry is in addition to the decoding circuitry already required for the cache memory banks.

Therefore, what is needed is repeater circuit for a very large on-die cache memory which overcomes the problems and drawbacks associated with the use of conventional tri-state bus drivers.

BRIEF DESCRIPTION OF THE DRAWINGS

The present invention will be understood more fully from the detailed description which follows and from the accompanying drawings, which however, should not be taken to limit the invention to the specific embodiments shown, but are for explanation and understanding only.

DETAILED DESCRIPTION

A repeater for use with an on-die cache memory is described. In the following description, numerous details are set forth, such as specific circuit configurations, logic device types, numerical values, etc., in order to provide a thorough understanding of the invention. It will be clear, however, to one skilled in the art, that these specific details may not be needed to practice the present invention.

In typical cache memory storage arrays that are organized into banks, when one bank is active, it drives a data bus. All of the bit signal lines of the data bus are usually collected at some central location on the die, from there the information is transmitted to the processor core. Because of the high frequencies that signals are driven at, and the smaller metal traces that are printed on the die using modern processing techniques, it is a need to repeat or rejuvenate the signal every so often. For example, in state-of-the-art semiconductor processing technology a transmitted signal needs to be repeated every 1500 microns or so of metal trace. Without some means of rejuvenating or repeating the signal, the RC delay associated with a long bus line operating at high frequency would result in loss of data.

According to the present invention, each bit of the cache memory bank is connected to a repeater that comprises logic which overcomes the drawbacks associated with the conventional use of tri-state buffers. In one embodiment, the invention comprises a single logic gate that drives an inverter. If a bank in the memory is unselected, its output is precharged so that it does not drive the bus. In this manner, when the bank connected to the logic gate is selected, the data stored in the cache array is transmitted through the combinatorial logic structure.

Figure 1:
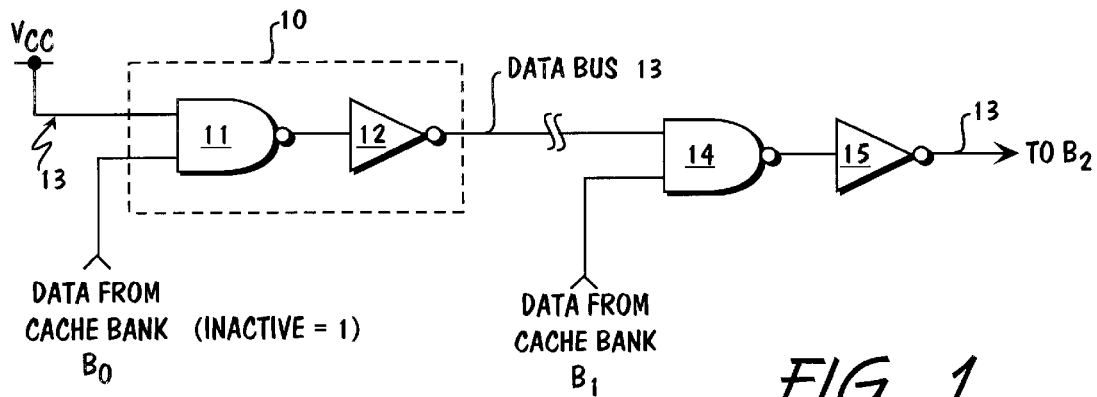
FIG. 1 is a logic diagram of a repeater circuit in accordance with one embodiment of the present invention.

With reference to FIG. 1, there is shown one embodiment of the present invention in which repeater 10 is connected in series with data bus 13. In this embodiment, repeater 10 comprises a 2-input NAND gate 11 having an output connected to the input of an inverter 12. One of the inputs of gate 11 is coupled to data bus 13, and the other input is coupled to receive data output from the subarray of an associated cache bank (in this example bank $B_0$). The output of inverter 12 drives data bus 13, which, in this example, is shown connected to another repeater comprising NAND gate 14 and inverter 15, both associated with a corresponding subarray of bank $B_1$.

The use of the repeater structure shown in FIG. 1 implies certain conventions be adopted in the cache memory architecture. One convention is that if the cache bank is unselected (i.e., inactive), the data output from the cache bank is held precharged (high). In the example of FIG. 1, the precharged state is a logical high potential (=1). A logical high potential at one input of NAND gate 11 means that repeater 10 will allow whatever signal is present on data bus 13 to pass through the repeater structure unaltered. That is, data driven from any other cache bank in the memory is unaffected by an inactive cache bank. In this way, repeaters may be concatenated together along a data bus line, with individual repeaters being associated with corresponding subarrays of each bank of cache memory storage.

Practitioners familiar with the data storage arts will also appreciate that the repeater structure of the present invention obviates the need for additional enable logic or enable pulses. This is made possible, in part, by the convention of precharging the output of the cache bank when the bank is inactive, and also by the convention of assigning a default logic value to the data bus itself. Note that in FIG. 1, data bus line 13 is initially coupled to a logical high potential (e.g., $V_{CC}$). In other words, the first segment of data bus 13 that is provided as one of the inputs to NAND gate 11 of the first cache bank ($B_0$) is driven by the positive supply potential of the integrated circuit. Thus, a logical high potential is the default value assigned to the data bus in the cache memory architecture of the embodiment of FIG. 1.

All together, the combinatorial logic gate structure of repeater 10 and the conventions of precharging the cache data output and assigning a default logic potential to the bus lines allows data to simply flow from cache bank to processor core, without concern about set-up and hold times. For instance, in the case where the data output from an active cache bank is a logical 1, it is already valid by the existing bus line state. The state of data bus line 13 only changes if the data value output from a given cache bank is a logical 0, in which case there is a propagation delay through all of the repeaters associated with each of the banks before the data on the bus becomes valid.

It should be understood that there is no precharging of the data bus line itself; that is, there is no switching or clocking applied to the data bus. A scheme in which the data bus is switched or clocked periodically would require some sort of dynamic driver design, adding complexity, power, and cost. Instead, the repeater structure of the present invention may be advantageously implemented with simple combinatorial logic.

Another important advantage of the present invention, as exemplified in FIG. 1, is that the NAND logic gate 11 may be made relatively small, with the inverter 12 made relatively large to drive the next segment of the bus. This construction has the benefit of providing increased speed and reduced power so that no additional repeaters are needed before the bus line reaches the next data bank in the cache memory.

Practitioners in the art will further appreciate that the approach of the present invention also provides another advantage when redundant subarrays are employed. Each subarray in a block can have its own enable signal that is used to switch the subarray on or off the bus. In this manner, a subarray can be substituted for any other subarray with just the switching of an enable signal, leaving the bus itself unchanged. Hence, the present invention permits implementing a redundant subarray scheme without adversely impacting power or speed.

Figure 3:
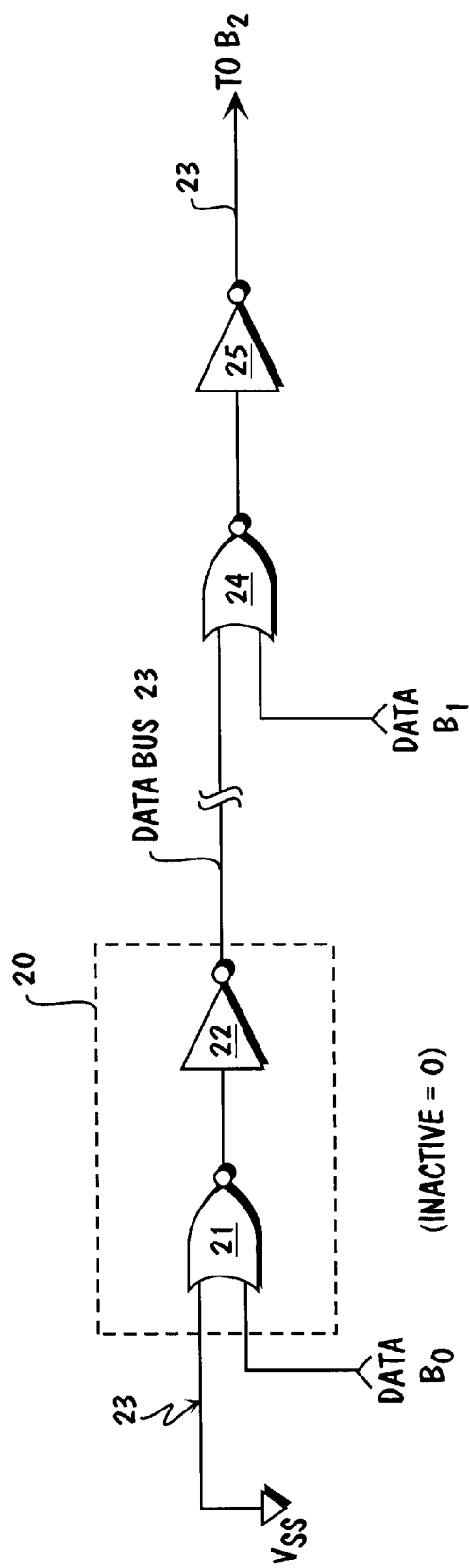
FIG. 3 is a logic diagram of a repeater circuit in accordance with another embodiment of the present invention

With reference now to FIG. 3, there is shown an alternative embodiment of the repeater structure of the present invention. The embodiment of FIG. 3 is essentially the same as that shown in FIG. 1 except that repeater 20 includes a NOR gate 21 instead of a NAND gate as the input logic device. The output of NOR gate 21 is coupled to inverter 22, which, in turn, drives data bus 23. As can be seen, repeater 20 is associated with cache bank $B_0$, and is concatenated in series on the bus with a second repeater (associated with bank $B_1$) comprising NOR gates 24 and inverter 25.

Instead of being precharged to a logical high potential, the data outputs from all inactive cache banks are precharged to a logical low potential (=0). Also, the default data bus logic level is a logical 0, e.g., $V_{SS}$. Thus, when the data output from an active bank is logically low, the data on the bus is already valid. The only case in which there is a propagation delay through the repeaters before the data on the bus becomes valid is when a cache bank outputs a logical 1. As discussed in connection with FIG. 1, a cache organization implemented using the repeaters shown in FIG. 3 has the advantage of permitting activation of redundant subarray elements with minimal overhead.

Figure 2:
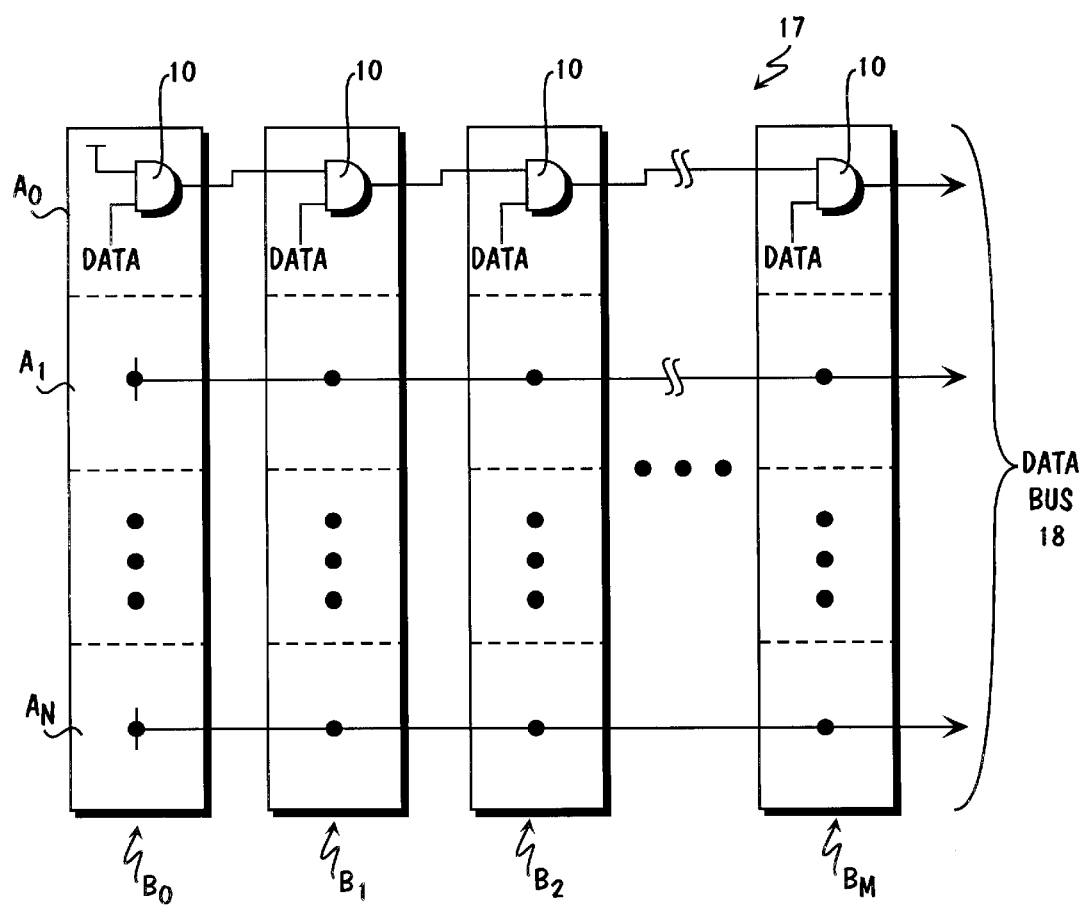
FIG. 2 is a circuit schematic diagram of a cache memory with repeaters according to one embodiment of the present invention.

FIG. 2 illustrates a cache memory 17 organized into banks ($B_0$–$B_M$) with repeaters associated with corresponding subarrays ($A_0$–$A_N$) of each bank in accordance to one embodiment of the present invention. By way of example, data from subarray $A_0$ of each bank is selectively connected to one of the lines of bus 18 through repeaters 10. In typical operation, only one of the banks of memory 17 is activated at a time, with the data from the subarrays of that bank being transmitted onto bus 18 exclusively. For instance, bank $B_2$ may be activated (with remaining banks $B_0$–$B_1$ and $B_3$–$B_M$ inactive) in order to read data stored in subarrays $A_0$–$A_N$ on bus 18.

It should be appreciated that the present invention allows cache memory 17 to be easily configurable to any size as spaced allows on the die. Moreover, the solution offered by the present invention may be used on any cache memory. For example, current cache memory designs often use the way hit information to decode individual wordlines internal to the subarray. According to the prior art, if the size of the cache memory is changed and the number of ways changes, then the subarray must be redesigned to accommodate the new number of ways. In contrast, according to the present invention, the way hit may be used to select a bank. If the number of ways is changed, the bank is simply added or removed from the die. This approach is much easier and less disruptive to the die floorplan as compared to prior art schemes, and no edits to the subarrays are required.

Practitioners in the art will further appreciate that the repeater structure described above is not limited to just memory array implementations. For example, the present invention may be advantageously utilized in any block of logic that requires interface to a bus. Accordingly, the specification and drawings are to be regarded in an illustrative rather than a restrictive sense.

We claim:

1. A repeater for series connection with a bus line, comprising:
    a receiver node coupled to receive a first logic value of the bus line;
    a driver node coupled to drive the bus line;
    a data input node coupled to a logic block, when in an active state the logic block providing a data value of either the first logic value or a second logic value to the data input node, when in an inactive state the logic block providing the first logic value to the data input node;
    logic having inputs coupled to the receiver and data input nodes, and an output coupled to the bus driver node, the logic to drive the first logic value on the bus line when the logic block is in the inactive state, and to drive the data value onto the bus line when the logic block is in the active state.

2. The repeater of claim 1 wherein the first logic value is 1 and the second logic value is 0.

3. The repeater of claim 2 wherein the logic comprises a NAND gate having first and second inputs coupled to the receiver and data input nodes, respectively.

4. The repeater of claim 3 wherein the logic further comprises:
    an inverter coupled between the NAND gate and the output.

5. The repeater of claim 4 wherein the NAND gate has a relatively small size.

6. The repeater of claim 5 wherein the inverter has a relatively large size.

7. The repeater of claim 1 wherein the first logic value is 0 and the second logic value is 1.

8. The repeater of claim 7 wherein the logic comprises a NOR gate having first and second inputs coupled to the receiver and data input nodes, respectively.

9. The repeater of claim 8 wherein the logic further comprises:
    an inverter coupled between the NOR gate and the output.

10. The repeater of claim 9 wherein the NOR gate has a relatively small size.

11. The repeater of claim 10 wherein the inverter has a relatively large size.

12. A repeater for series connection with a bus line, comprising:
    a first logic device having a first input coupled to receive a first logic value of the bus line, a second input coupled to a cache bank, and an output, the first logic device to provide the first logic value at the output when the cache bank is in an inactive state, and to provide a data value from the cache bank at the output when the cache bank is in an active state, the data value being either the first logic value or a second logic value;
    an inverter coupled between the output of the first logic device and the bus line, the inverter driving either the first or second logic value onto the bus line.

13. The repeater of claim 12 wherein the first logic value is 1 and the second logic value is 0.

14. The repeater of claim 13 wherein the first logic device comprises a NAND gate.

15. The repeater of claim 14 wherein the NAND gate has a relatively small size and the inverter has a relatively large size.

16. The repeater of claim 12 wherein the first logic value is 0 and the second logic value is 1.

17. The repeater of claim 16 wherein the first logic device comprises a NOR gate.

18. The repeater of claim 17 wherein the NOR gate has a relatively small size and the inverter has a relatively large size.

19. A cache memory comprising:
    a plurality of cache banks, each cache bank including a plurality of memory cell subarrays to store data;
    a data bus having a plurality of bus lines;
    repeaters to connect data from the subarrays to the data bus, each repeater comprising:
        a first logic device having a first input coupled to receive a first logic value of a bus line, a second input coupled to a subarray, and an output, the first logic device providing the first logic value at the output when the subarray is in an inactive state, and to provide a data value from the subarray at the output when the subarray is in an active state, the data value being either the first logic value or a second logic value;
        an inverter coupled between the output of the first logic device and the bus line, the inverter driving either the first or second logic value onto the bus line.

20. The repeater of claim 19 wherein the first logic value is 1 and the second logic value is 0.

21. The repeater of claim 20 wherein the first logic device comprises a NAND gate.

22. The repeater of claim 21 wherein the NAND gate has a relatively small size and the inverter has a relatively large size.

23. The repeater of claim 19 wherein the first logic value is 0 and the second logic value is 1.

24. The repeater of claim 23 wherein the first logic device comprises a NOR gate.

25. The repeater of claim 24 wherein the NOR gate has a relatively small size and the inverter has a relatively large size.

26. A repeater for connection to a bus line, comprising:
    a receiver node coupled to a first segment of the bus line;
    a driver node coupled to a next segment of the bus line;
    a data input node coupled to a cache array, when in an active state the cache array providing a data value of either a first logic value or a second logic value at the data input node, when in an inactive state the cache array providing the first logic value at the data input node;
    means having inputs coupled to the receiver and data input nodes and an output coupled to the driver node for driving the first logic value on the bus line at the driver node when the cache array is in the inactive state, and to drive the data value onto the bus line when the cache array is in the active state.

27. The repeater of claim 26 wherein the first logic value is 1 and the second logic value is 0.

28. The repeater of claim 27 wherein the means comprises a NAND gate coupled in series with an inverter, the NAND gate having first and second inputs coupled to the receiver and data input nodes, respectively; the inverter having an output connected to the driver node.

29. The repeater of claim 26 wherein the first logic value is 0 and the second logic value is 1.

30. The repeater of claim 29 wherein the means comprises a NOR gate coupled in series with an inverter, the NOR gate having first and second inputs coupled to the receiver and data input nodes, respectively; the inverter having an output connected to the driver node.

* * * * *